US012771733B2

(12) United States Patent
Uwamori

(10) Patent No.: US 12,771,733 B2
(45) Date of Patent: Oct. 20, 2026

(54) COMMUNICATION TERMINAL AND CONTROL METHOD

(71) Applicant: ICOM INCORPORATED, Osaka (JP)

(72) Inventor: Keishiro Uwamori, Osaka (JP)

(73) Assignee: ICOM INCORPORATED, Osaka (JP)

( * ) Notice: Subject to any disclaimer, the term of this patent is extended or adjusted under 35 U.S.C. 154(b) by 42 days.

(21) Appl. No.: 18/999,297

(22) Filed: Dec. 23, 2024

(65) Prior Publication Data

US 2025/0211625 A1 Jun. 26, 2025

(30) Foreign Application Priority Data

Dec. 26, 2023 (JP) ................................. 2023-220056

(51) Int. Cl.
*H04L 65/1046* (2022.01)
*G10K 11/175* (2006.01)
*H04L 65/1069* (2022.01)

(52) U.S. Cl.
CPC ...... *H04L 65/1046* (2013.01); *G10K 11/1754* (2020.05); *H04L 65/1069* (2013.01)

(58) Field of Classification Search
None
See application file for complete search history.

(56) References Cited

U.S. PATENT DOCUMENTS

| | | | | |
|---|---|---|---|---|
| 11,750,668 | B1 * | 9/2023 | Abkairov | H04L 65/1053 370/352 |
| 2007/0183402 | A1 * | 8/2007 | Bennett | H04L 65/1069 370/352 |
| 2016/0036962 | A1 * | 2/2016 | Rand | G06F 3/165 455/418 |
| 2016/0050547 | A1 * | 2/2016 | Wong | H04M 1/6058 455/518 |
| 2020/0137623 | A1 * | 4/2020 | Nirwani | H04L 47/803 |
| 2021/0329056 | A1 | 10/2021 | Sonobe | |
| 2021/0329420 | A1 * | 10/2021 | Chee | H04W 4/10 |
| 2023/0344884 | A1 * | 10/2023 | Ben Hellal | G06F 3/162 |

FOREIGN PATENT DOCUMENTS

JP 2020053837 A 4/2020

* cited by examiner

*Primary Examiner* — Chris Parry
*Assistant Examiner* — Abderrahmen Chouat
(74) *Attorney, Agent, or Firm* — NK Patent Law

(57) ABSTRACT

To provide a communication terminal capable of easily determining which of calling via IP wireless communication and calling via IP telephone communication to use. A communication terminal includes: a main body-side codec which decodes an output signal from a call control section and outputs the decoded output signal to a main body-side speaker and which encodes an input signal from a main body-side microphone and the encoded input signal to the call control section; and a handset-side codec which decodes an output signal from the call control section and outputs the decoded output signal to a handset-side speaker and encodes an input signal from a handset-side microphone and inputs the encoded input signal to the call control section.

5 Claims, 4 Drawing Sheets

COMMUNICATION TERMINAL AND CONTROL METHOD

CROSS-REFERENCE TO RELATED APPLICATIONS

This Nonprovisional application claims priority under 35 U.S.C. § 119 on Patent Application No. 2023-220056 filed in Japan on Dec. 26, 2023, the entire contents of which are hereby incorporated by reference.

TECHNICAL FIELD

The present invention relates to a communication terminal and a method for controlling the communication terminal.

BACKGROUND ART

Heretofore, there has been proposed a relay device which relays, over a network, voice communication of transceivers or telephones. By connecting a plurality of relay devices via a network, it is also possible to enable voice communication between different types of communication devices such as between an IP telephone and a wireless device.

Patent Literature 1 discloses a relay device which enables switching a transmission control system for a voice signal from one to another in accordance with a function of a destination of communication. In a case where an SIP telephone makes a call to an analog transceiver, the relay device determines an address and a device type of the analog transceiver on the basis of calling information, and transmits, to the analog transceiver, a voice signal according to a transmission control system suitable for the analog transceiver.

There is also a practically-used communication terminal having both (a) an IP telephone call function which operates according to SIP and (b) a PTT call function which operates according to the PTT method by using an IP network. In the descriptions below, for convenience, communication according to the PTT method will be referred to as "IP wireless communication" and calling via the IP wireless communication will be referred to as "IP wireless calling", even in a case where the communication terminal is in connected in a wired manner.

CITATION LIST

Patent Literature

Patent Literature 1

Japanese Patent Application Publication, Tokukai, No. 2020-53837

SUMMARY OF INVENTION

Technical Problem

With the communication terminal having both the IP telephone call function and the IP wireless call function, calling is carried out via a single microphone and a single speaker. In this case, switching between the IP telephone call function and the IP wireless call function is carried out in response to an instruction input from a user. Meanwhile, for example, a stationary communication terminal including a main body-side speaker, a main body-side microphone, a handset-side speaker, and a handset-side microphone has room for improvement in the way of determining which of the IP telephone call function and the IP wireless call function to use.

An aspect of the present invention has an object to provide a communication terminal capable of easily determining which of calling via the IP wireless communication and calling via the IP telephone communication to use.

Solution to Problem

In order to attain the above object, a communication terminal in accordance with an aspect of the present invention includes: a Push to Talk call processing section which carries out Push to Talk calling according to a Push to Talk method; an Internet Protocol telephone processing section which carries out Internet Protocol telephone calling according to Session Initiation Protocol via an Internet Protocol network; a call control section which controls (a) Push to Talk calling via the Push to Talk call processing section and (b) calling via the Internet Protocol telephone processing section; a main body including a main body-side speaker and a main body-side microphone each of which carries out calling via the Push to Talk call processing section; a handset including a handset-side speaker and a handset-side microphone each of which carries out calling via the Internet Protocol telephone processing section; a main body-side codec which decodes an output signal from the call control section and outputs the decoded output signal to the main body-side speaker and which encodes an input signal from the main body-side microphone and inputs the encoded input signal to the call control section; and a handset-side codec which decodes an output signal from the call control section and outputs the decoded output signal to the handset-side speaker and which encodes an input signal from the handset-side microphone and inputs the encoded input signal to the call control section.

A method for controlling a communication terminal in accordance with an aspect of the present invention is a method for controlling a communication terminal that includes: a Push to Talk call processing section which carries out Push to Talk calling according to a Push to Talk method; an Internet Protocol telephone processing section which carries out Internet Protocol telephone calling according to Session Initiation Protocol via an Internet Protocol network; a call control section which controls (a) Push to Talk calling via the Push to Talk call processing section and (b) calling via the Internet Protocol telephone processing section; a main body including a main body-side speaker and a main body-side microphone each of which carries out calling via the Push to Talk call processing section; a handset including a handset-side speaker and a handset-side microphone each of which carries out calling via the Internet Protocol telephone processing section, the method including the steps of: decoding an output signal from the call control section and outputting the decoded output signal to the main body-side speaker; encoding an input signal from the main body-side microphone and inputting the encoded input signal to the call control section; decoding an output signal from the call control section and outputting the decoded output signal to the handset-side speaker; and encoding an input signal from the handset-side microphone and inputting the encoded input signal to the call control section.

Advantageous Effects of Invention

In accordance with an aspect of the present invention, it is possible to provide a communication terminal capable of easily determining which of calling via the IP wireless communication and calling via the IP telephone communication to use.

DESCRIPTION OF EMBODIMENTS

The following description will discuss an embodiment of the present invention in detail.

Communication System

Figure 1:
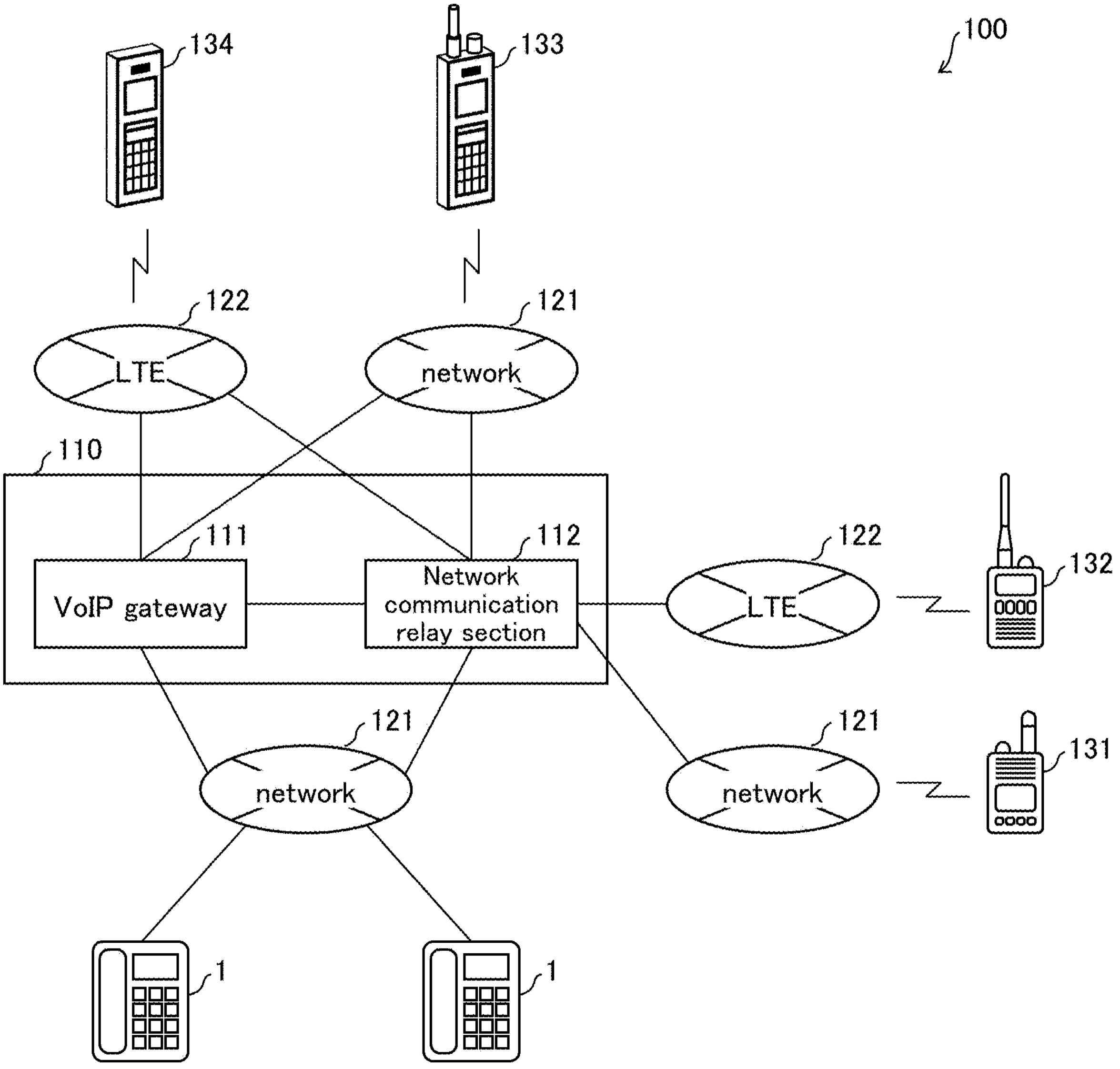
FIG. 1 is a view illustrating an example of a configuration of a communication system including a communication terminal in accordance with a first embodiment.

FIG. 1 is a view illustrating an example of a configuration of a communication system 100 including a communication terminal 1 in accordance with a first embodiment. In the example shown in FIG. 1, the communication system 100 includes a relay device 110, a communication terminal 1, and communication terminals 131, 132, 133, and 134.

The communication terminal 1 is a communication terminal capable of carrying out communication according to a plurality of communication methods. Specifically, the communication terminal 1 has a Push to Talk (PTT) call function which operates according to the PTT method by using an Internet Protocol (IP) network and an IP telephone call function which operates according to Session Initiation Protocol (SIP) via IP telephone communication. As described later, the communication terminal 1 may be connected to an IP network 121 via wired connection or wireless connection. In the descriptions below, for convenience, communication according to the PTT method will be referred to as "IP wireless communication" and calling via the IP wireless communication will be referred to as an "IP wireless call function", even in a case where the communication terminal is in connected in a wired manner. The communication terminal 1 is connected to the IP network 121 via wired connection or wireless connection, and is connected to the relay device 110 via the IP network 121. A specific configuration of the communication terminal 1 will be described later. Note that the communication according to the PTT method is not limited to the one carried out via the IP network, and may be carried out via another kind of communication network.

Each of the communication terminals 131 to 134 is a communication terminal capable of carrying out calling via the IP wireless communication or IP telephone communication. The communication terminal 131 is connected to the relay device 110 via the IP network 121, and carries out IP wireless communication. The communication terminal 132 is connected to the relay device 110 via a Long-Term Evolution (LTE) communication network 122 including a base station (not illustrated), and carries out IP wireless communication. The communication terminal 133 is connected to the relay device 110 via the IP network 121, and carries out IP wireless communication or IP telephone communication. The communication terminal 134 is connected to the relay device 110 via the LTE communication network 122, and carries out IP wireless communication or IP telephone communication.

The relay device 110 is a device including a Voice over Internet Protocol (VoIP) gateway 111 and a network communication relay section 112 which are integrated together. Note, however, that the communication system 100 does not necessarily need to include the relay device 110 including the VoIP gateway 111 and the network communication relay section 112 which are integrated together. Alternatively, the communication system 100 may include a VoIP gateway 111 and a network communication relay section 112 which are separately provided.

The VoIP gateway 111 is a gateway device which relays (a) VoIP procedures for transmitting a voice signal via the IP network 121 and (b) a communication terminal which carries out telephone communication. The VoIP gateway 111 relays IP telephone communication between the communication terminal 1 and the communication terminals 133 and 134 or relays IP telephone communication between the communication terminals 133 and 134. The communication terminal 134 is connected to the VoIP gateway 111 in the relay device 110 via the LTE communication network 122.

The VoIP gateway 111 includes a Session Initiation Protocol (SIP) server function. The SIP server function is a function for carrying out a calling control which uses the SIP protocol to associate a phone number (URI) with an IP address and make a call and connection to a telephone which is a destination of communication. Note that the communication system 100 may include, instead of the VoIP gateway 111, an Internet Protocol Private Branch exchange (IP-PBX) device which carries out circuit switching of a communication terminal having an IP telephone communication function.

The network communication relay section 112 relays communication between the communication terminal 1 and the communication terminals 131 to 134 or communication between the communication terminals 131 and 134. In particular, the network communication relay section 112 relays IP wireless communication between the communication terminal 1 and the communication terminals 131 to 134 or IP wireless communication between the communication terminals 131 to 134.

Further, the network communication relay section 112 receives a voice packet transmitted from the communication terminal 1 or the communication terminal(s) 131 and/or 133. Furthermore, on the basis of communication control information written in the voice packet, the network communication relay section 112 distributes a voice signal of this packet to the communication terminal 1 or the communication terminal(s) 131 and/or 133, which is/are a destination of communication. With this, a user can carry out voice communication via the IP network 121 while feeling as if the user is using a conventional transceiver.

Note that, in the relay device 110, the VoIP gateway 111 and the network communication relay section 112 may be connected to each other so as to enable calling between a communication terminal which is carrying out IP telephone communication and a communication terminal which is carrying out IP wireless communication.

Configuration of Communication Terminal

Figure 2:
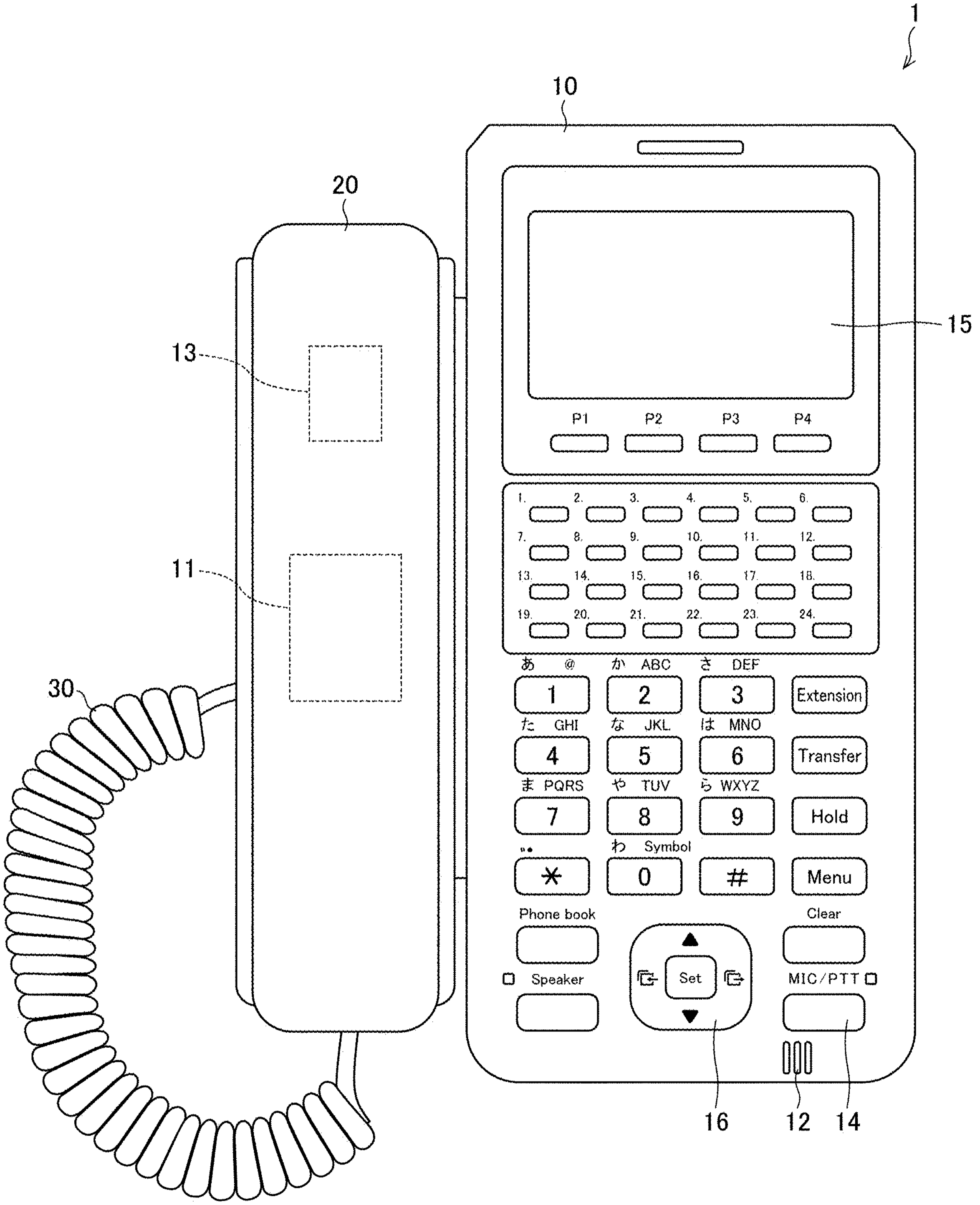
FIG. 2 is a plan view illustrating an example of an appearance of the communication terminal in accordance with the first embodiment.
Figure 3:
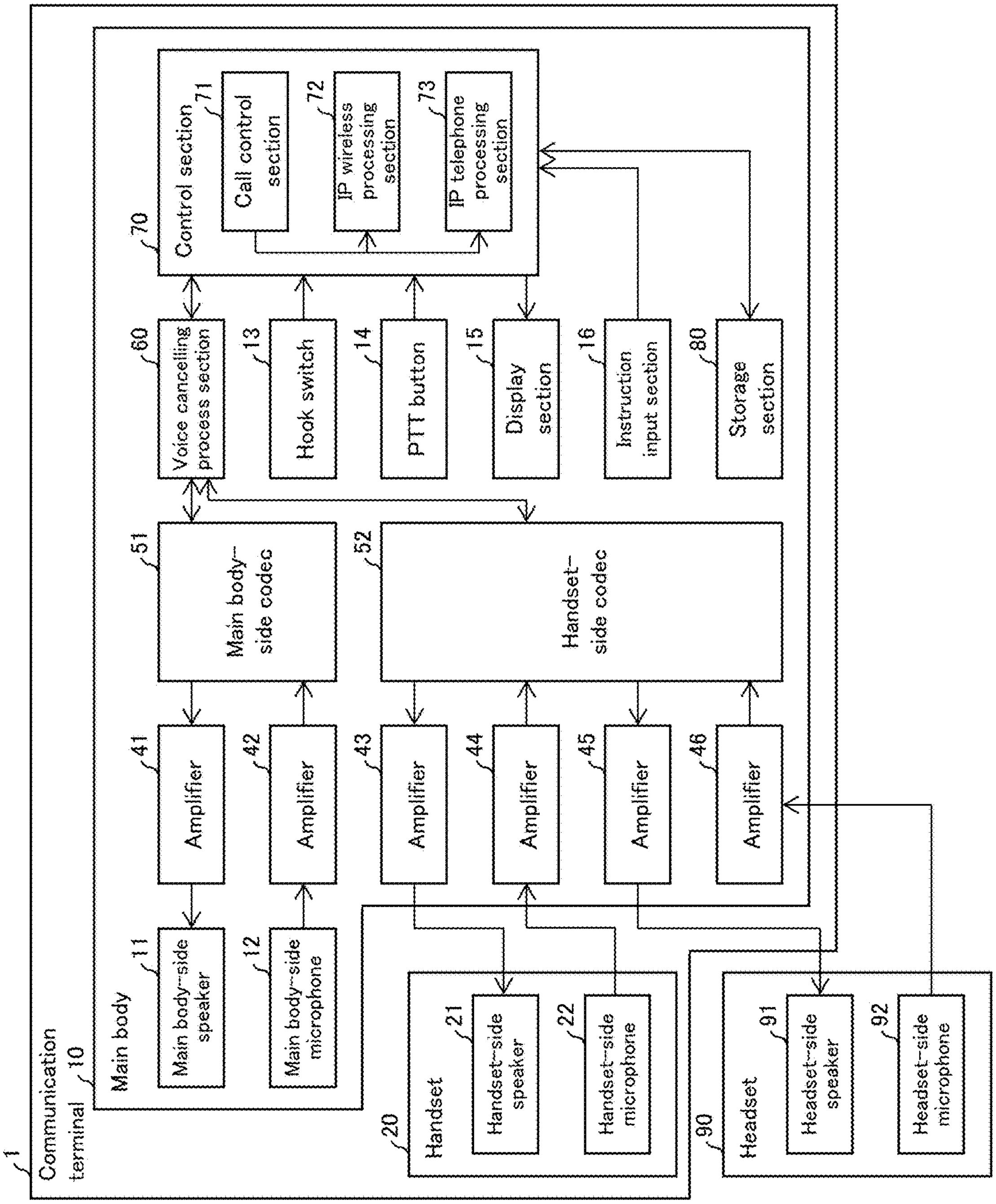
FIG. 3 is a block diagram illustrating an example of a configuration of a main part of the communication terminal in accordance with the first embodiment.

FIG. 2 is a plan view illustrating an example of an appearance of the communication terminal 1. FIG. 3 is a block diagram illustrating an example of a configuration of a main part of the communication terminal 1. In the example shown in FIGS. 2 and 3, the communication terminal 1 includes a main body 10, a handset 20, and a code 30. In FIG. 3, the code 30 is not illustrated.

The main body 10 includes a main body-side speaker 11 and a main body-side microphone 12. The main body-side speaker 11 outputs a voice while calling is carried out by the main body 10. The main body-side microphone 12 accepts input of a voice while calling is carried out by the main body 10.

The main body 10 further includes a hook switch 13. The hook switch 13 is pressed in a state where the handset 20 is in an on-hook state, and is released in a state where the handset 20 is in an off-hook state. That is, the hook switch 13 is a switch for determining whether or not the handset 20 is brought into an off-hook state.

The main body 10 further includes a PTT button 14. The PTT button 14 is a button for starting speech according to the PTT method. For example, the communication terminal 1 may start speech at a timing when a user presses the PTT button 14 and may end speech at a timing when the user releases the PTT button 14. Alternatively, the communication terminal 1 may start speech at a timing when the user presses and releases the PTT button 14 and may end speech at a timing when the user presses and releases the PTT button 14 again.

The main body 10 further includes a display section 15. The display section 15 displays information about operation of the communication terminal 1. The display section 15 may be a known display device such as a liquid crystal panel.

The main body 10 further includes an instruction input section 16. The instruction input section 16 may be a button provided on a surface of the main body 10. However, this is not limitative. For example, the instruction input section 16 may be a touch panel provided so that the touch panel overlaps the display section 15. The instruction input section 16 accepts an instruction input from a user, the instruction input being for displaying, on the display section 15, at least one selected from the group consisting of a call destination list, a reception history or an incoming call history, and a transmission history or an outgoing call history.

The handset 20 includes a handset-side speaker 21 and a handset-side microphone 22 (see FIG. 3). The handset-side speaker 21 outputs a voice while calling is carried out by the handset 20. The handset-side microphone 22 accepts input of a voice while calling is carried out by the handset 20. While communication is carried out by the handset 20, the user may grip the handset 20 at a position near his/her head so that the handset-side speaker 21 is located close to the user's ear and the handset-side microphone 22 is located close to the user's mouth.

The code 30 is a code which connects the main body 10 and the handset 20 to each other. The code 30 can be any known code, which can be selected without any limitation.

Further, a headset 90 is connectable to the communication terminal 1, as shown in FIG. 3. The user can connect the headset 90 to the communication terminal 1 and carry out calling. The headset 90 includes a headset-side speaker 91 and a headset-side microphone 92. The headset-side speaker 91 outputs a voice while calling is carried out by the handset 90. The headset-side microphone 92 accepts input of a voice while calling is carried out by the headset 90.

Detailed Configuration of Main Body

The following will describe a detailed configuration of the main body 10.

The main body 10 includes amplifiers 41, 42, 43, 44, 45, and 46. The amplifier 41 amplifies a voice signal which is to be output to the main body-side speaker 11. The amplifier 42 amplifies a voice signal which is input from the main body-side microphone 12. The amplifier 43 amplifies a voice signal which is to be output to the handset-side speaker 21. The amplifier 44 amplifies a voice signal which is input from the handset-side microphone 22. The amplifier 45 amplifies a voice signal which is to be output to the headset-side speaker 91, in a case where the headset 90 is connected to the communication terminal 1. The amplifier 46 amplifies a voice signal which is input from the headset-side microphone 92, in a case where the headset 90 is connected to the communication terminal 1. Note that amplification for the handset-side speaker 21 and amplification for the headset-side speaker 91 may be carried out by a single amplifier and a destination of connection may be switched from one to another by a switch as appropriate. Similarly, amplification for the handset-side microphone 22 and amplification for the headset-side microphone 92 may be carried out by a single amplifier and a destination of connection may be switched from one to another by a switch as appropriate.

The main body 10 further includes a main body-side codec 51 and a handset-side codec 52. The main body-side codec 51 decodes an output signal from the call control section 71 and outputs the decoded output signal to the main body-side speaker 11, and encodes an input signal from the main body-side microphone 12 and inputs the encoded input signal to the call control section 71. The handset-side codec 52 decodes an output signal from the call control section 71 and outputs the decoded output signal to the handset-side speaker 21, and encodes an input signal from the handset-side microphone 22 and inputs the encoded input signal to the call control section 71. In a case where the headset 90 is connected to the communication terminal 1 and a user carries out calling by the headset 90, the handset-side codec 52 decodes an output signal from the call control section 71 and outputs the decoded output signal to the headset-side speaker 91, and encodes an input signal from the headset-side microphone 92 and inputs the encoded input signal to the call control section 71.

The main body 10 further includes a voice cancelling process section 60. The voice cancelling process section 60 removes, from a voice signal which is input from the main body-side microphone 12 or the handset-side microphone 22, a voice signal which is output to the main body-side speaker 11 and the handset-side speaker 21. In a case where the headset 90 is connected to the communication terminal 1, the voice cancelling process section 60 removes, from a voice signal which is input from the main body-side microphone 12, the handset-side microphone 22, or the headset-side microphone 92, a voice signal which is output to the main body-side speaker 11, the handset-side speaker 21, and the headset-side speaker 91.

That is, the voice cancelling process section 60 prevents (i) howling which may otherwise be caused when an output from the main body-side speaker 11 is input to the main body-side microphone 12 and (ii) howling which may otherwise by caused when an output from the handset-side speaker 21 is input to the handset-side microphone 22. Further, even in a case where the IP telephone communication is carried out by the handset 20, the voice cancelling process section 60 can cancel, from a voice signal of the handset-side microphone 22, not only an output from the handset-side speaker 21 but also an output from the main body-side speaker 11 to suppress or prevent the outputs from being mixed into calling carried out on the handset 20 side. Consequently, in any of a case where a voice signal is input from the main body-side microphone 12, a case where a voice signal is input from the handset-side microphone 22, and a case where a voice signal is input from the headset-side microphone 92, it is possible to improve the quality of a voice signal to be transmitted to the outside.

The main body 10 further includes a control section 70. The control section 70 controls operation of the communication terminal 1. The control section 70 includes a call control section 71, an IP wireless processing section 72 (PTT call processing section), and an IP telephone processing section 73.

The IP wireless processing section 72 carries out the IP wireless communication according to the PTT method via the IP network 121. The IP telephone processing section 73 carries out the IP telephone communication according to SIP via the IP network 121. The call control section 71 controls calling via the IP wireless processing section 72 and calling via the IP telephone processing section 73.

In a case where the PTT button 14 is pressed by the user while calling via the IP telephone processing section 73 is carried out by the handset-side speaker 21 and the handset-side microphone 22, the IP telephone processing section 73 may mute a voice input from the handset-side microphone 22 for a period in which the PTT button 14 is pressed. This process carried out in the IP telephone processing section 73 will be described later with reference to FIG. 4.

Meanwhile, even in a case where the PTT button 14 is pressed by the user while calling via the IP telephone processing section 73 is carried out by the handset-side speaker 21 and the handset-side microphone 22, the IP wireless processing section 72 may not output a voice input from the main body-side microphone 12 as speech in calling via the IP wireless processing section 72. This process carried out in the IP telephone processing section 73 will be described later with reference to FIG. 5.

The subjects of control by the control section 70 are not limited to the processes of the call control section 71, the IP wireless processing section 72, and the IP telephone processing section 73. Alternatively, the control section 70 may control overall operation of the communication terminal 1. For example, the control section 70 controls the display section 15 so as to display the above-described information.

The main body 10 further includes the storage section 80. The storage section 80 is a storage device storing therein information that the control section 70 requires to control the communication terminal 1. Note, however, that the storage section 80 is not essential for the communication terminal 1. In a case where the communication terminal 1 does not include the storage section 80, the communication terminal 1 may be communicably connected to an external storage device.

In the communication terminal 1, calling via the IP wireless processing section 72 is carried out by the main body-side speaker 11 and the main body-side microphone 12. Meanwhile, calling via the IP telephone processing section 73 is carried out by the handset-side speaker 21 and the handset-side microphone 22. Thus, with the communication terminal 1 capable of both calling via the IP wireless communication and calling via the IP telephone communication, the user can easily determine which of the calling via the IP wireless communication and the calling via the IP telephone communication to use, without getting confused.

Further, as described above, the main body-side codec 51 decodes an output signal from the call control section 71 and outputs the decoded output signal to the main body-side speaker 11, and encodes an input signal from the main body-side microphone 12 and inputs the encoded input signal to the call control section 71. The handset-side codec 52 decodes an output signal from the call control section 71 and outputs the decoded output signal to the handset-side speaker 21, and encodes an input signal from the handset-side microphone 22 and inputs the encoded input signal to the call control section 71.

Thus, in the communication terminal 1, (a) voice input and output with the main body-side speaker 11 and the main body-side microphone 12 and (b) voice input and output with the handset-side speaker 21 and the handset-side microphone 22 can be carried out independently. Therefore, in processing two types of communications simultaneously, it is possible to allocate these communications to (a) the main body-side speaker 11 and the main body-side microphone 12 and (b) the handset-side speaker 21 and the handset-side microphone 22 so as to cause the main body side and the handset side to carry out voice input and output.

In a conventional configuration, a single codec is used to exclusively carry out switching between the main body 10 side and the handset 20 side and to carry out voice input and output. With such a configuration, for example, if an incoming call of one type of communication arrives while calling via the other type of communication is carried out, it becomes necessary to adjust an output level of a calling sound depending on which of the main body 10 side and the handset 20 side is used at that time. This requires troublesome control. In contrast, according to the above configuration, the control section 70 can set output levels for the main body 10 side and the handset 20 side, respectively. Thus, control for carrying out the above switching is made easier.

Further, the voice cancelling process section 60 cancels, from an input voice signal generated by the handset-side microphone 22, a voice output from the main body-side speaker 11. This makes it possible to suppress or prevent a voice output from the main body-side speaker 11 from being mixed in calling carried out on the handset 20 side. Thus, even in a case where two types of communications, that is, calling via the IP wireless communication and calling via the IP telephone communication are carried out simultaneously, it is possible to suppress or prevent a voice from interfering each of the communications.

Moreover, in the communication terminal 1, the PTT button 14 for starting speech according to the PTT method is provided to the main body 10, as described above. Thus, while calling via the IP wireless communication is carried out by the main body-side speaker 11 and the main body-side microphone 12, the user can make speech by pressing the PTT button 14 provided to the main body 10.

One Example of Method for Controlling Communication Terminal

Figure 4:
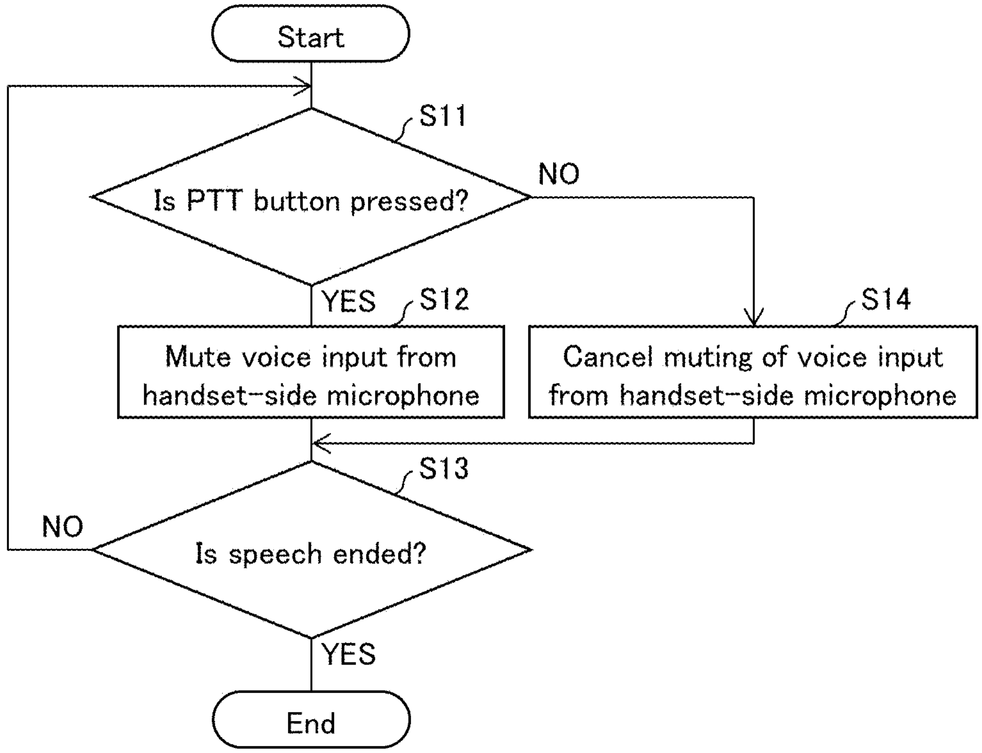
FIG. 4 is a flowchart illustrating an example of a method for controlling the communication terminal in accordance with the first embodiment.

FIG. 4 is a flowchart illustrating an example of a method for controlling the communication terminal 1. The control method shown in FIG. 4 is started when speech via the IP telephone processing section 73 is started by the handset-side speaker 21 and the handset-side microphone 22.

In the control method shown in FIG. 4, the IP telephone processing section 73 determines whether or not the PTT button 14 is pressed by the user (S11). If the PTT button 14 is pressed by the user (YES in S11), the IP telephone processing section 73 mutes a voice input from the handset-side microphone (S12). At this point, if it is in a state where a voice input from the handset-side microphone is already muted, this state continues. At this time, in response to user's pressing the PTT button 14, the IP wireless processing section 72 starts speech according to the PTT method.

Thereafter, the IP telephone processing section 73 determines whether or not the speech is ended (S13). If the speech is ended (YES in S13), the IP telephone processing section 73 ends the process. If the speech is not ended (NO in S13), the IP telephone processing section 73 carries out the processes starting from step S11 again.

Meanwhile, if the PTT button 14 is not pressed by the user (NO in S11), the IP telephone processing section 73 cancels the muting of the voice input from the handset-side microphone (S14). At this point, if it is in a state where a voice input from the handset-side microphone is not muted, this state continues. Thereafter, the IP telephone processing section 73 executes step S13.

According to the control method shown in FIG. 4, if the PTT button 14 is pressed during IP telephone calling, a voice input from the handset-side microphone 22 is muted. Thus, in a case where IP wireless calling starts during IP telephone calling, merely by pressing the PTT button 14 to make speech in the IP wireless calling, the user can prevent a conversation partner of the IP telephone calling from hearing a content of the speech.

Another Example of Method for Controlling Communication Terminal

Figure 5:
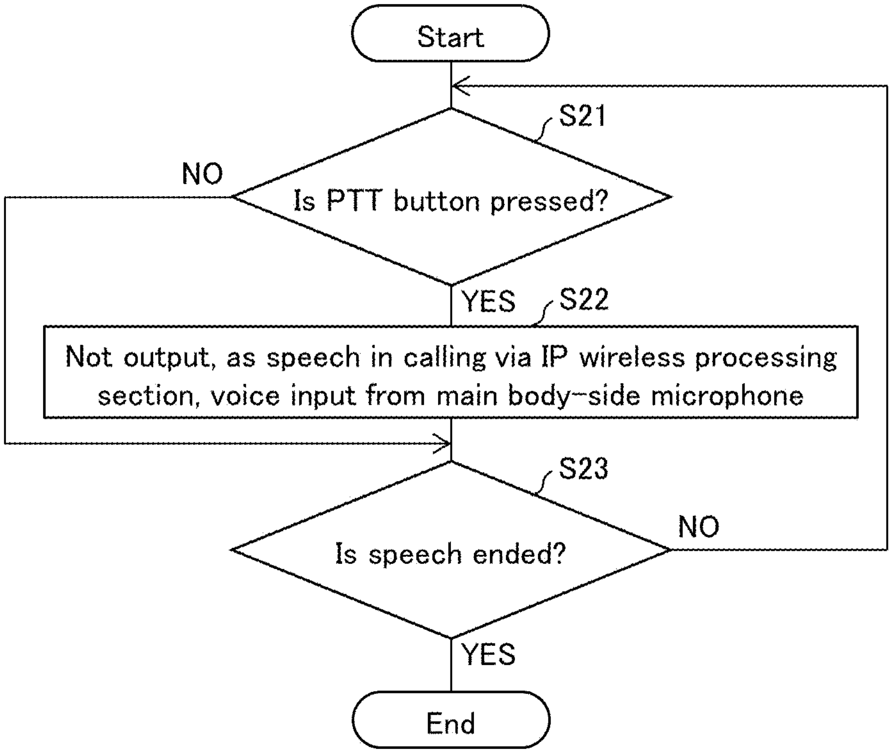
FIG. 5 is a flowchart illustrating another example, which is different from the example shown in FIG. 4, of the method for controlling the communication terminal in accordance with the first embodiment.

FIG. 5 is a flowchart illustrating another example, which is different from the example shown in FIG. 4, of the method for controlling the communication terminal 1. The control method shown in FIG. 5 is also started when speech via the IP telephone processing section 73 is started by the handset-side speaker 21 and the handset-side microphone 22.

In the control method shown in FIG. 5, the IP wireless processing section 72 determines whether or not the PTT button 14 is pressed by the user (S21). If the PTT button 14 is pressed by the user (YES in S21), the IP wireless processing section 72 does not output, as speech in calling via the IP wireless processing section 72, a voice input from the main body-side microphone 12 (S22).

Thereafter, the IP wireless processing section 72 determines whether or not the speech is ended (S23). If the speech is ended (YES in S23), the IP wireless processing section 72 ends the process. If the speech is not ended (NO in S23), the IP wireless processing section 72 carries out the processes starting from step S21 again. Meanwhile, if the PTT button 14 is not pressed by the user (NO in S21), the IP wireless processing section 72 skips step S22 and executes step S23.

According to the control method shown in FIG. 5, even if the PTT button 14 is pressed during IP telephone calling, a voice input from the main body-side microphone 12 would not be output as speech in calling via the IP wireless processing section 72. Thus, in a case where IP telephone calling and IP wireless calling are carried out simultaneously, it is possible to inhibit making speech in the IP wireless calling. Therefore, it is possible to prevent mixing between speech in IP telephone calling and speech in IP wireless calling.

Software Implementation Example

The functions of the communication terminal 1 (hereinafter, referred to as a "device") can be realized by a program for causing a computer to function as the device, the program causing the computer to function as the control blocks (in particular, the sections of the control section 70) of the device.

In this case, the device includes, as hardware for executing the program, a computer which includes (i) at least one control device (e.g., processor) and (ii) at least one storage device (e.g., memory). By the control device and the storage device executing the program, the functions described in the foregoing embodiments are realized.

The program may be stored in one or more non-transitory, computer-readable storage media. The one or more storage media may or may not be provided to the device. In the latter case, the program may be supplied to the device via any wired or wireless transmission medium.

Further, some or all of the functions of the control blocks can be realized by a logic circuit. For example, the present invention encompasses, in its scope, an integrated circuit in which a logic circuit that functions as each of the control blocks is formed.

Aspects of the present invention can also be expressed as follows:

The present invention can also be expressed as below.

A communication terminal in accordance with a first aspect of the present invention includes: a Push to Talk call processing section which carries out Push to Talk calling according to a Push to Talk method; an Internet Protocol telephone processing section which carries out Internet Protocol telephone calling according to Session Initiation Protocol via an Internet Protocol network; a call control section which controls (a) Push to Talk calling via the Push to Talk call processing section and (b) calling via the Internet Protocol telephone processing section; a m main body including a main body-side speaker and a main body-side microphone each of which carries out input and output of a voice in calling via the Push to Talk call processing section; a handset including a handset-side speaker and a handset-side microphone each of which carries out input and output of a voice in calling via the Internet Protocol telephone processing section; a main body-side codec which decodes an output signal from the call control section and outputs the decoded output signal to the main body-side speaker and which encodes an input signal from the main body-side microphone and inputs the encoded input signal to the call control section; and a handset-side codec which decodes an output signal from the call control section and outputs the decoded output signal to the handset-side speaker and which encodes an input signal from the handset-side microphone and inputs the encoded input signal to the call control section.

According to the above configuration, the PTT calling is carried out by the main body-side speaker and the main body-side microphone, and the IP telephone call is carried out by the handset-side speaker and the handset-side microphone. Thus, with a communication terminal capable of both the PTT calling and the IP telephone calling, the user can easily determine which of the PTT calling and the IP telephone calling to use, without getting confused.

Further, (a) voice input and output with the main body-side speaker and the main body-side microphone and (b) voice input and output with the handset-side speaker and the handset-side microphone can be carried out independently. Therefore, in processing two types of communications simultaneously, it is possible to allocate these communications to (a) the main body-side speaker and the main body-side microphone and (b) the handset-side speaker and the handset-side microphone so as to cause the main body side and the handset side to carry out voice input and output.

In a conventional configuration, a single codec is used to exclusively carry out switching between the main body side and the handset side and to carry out voice input and output. With such a configuration, for example, if an incoming call of one type of communication arrives while calling via the other type of communication is carried out, it becomes necessary to adjust an output level of a calling sound depending on which of the main body side and the handset side is used at that time. This requires troublesome control. In contrast, according to the above configuration, the control section can set output levels for the main body side and the handset side, respectively. Thus, control for carrying out the above switching is made easier.

A communication terminal in accordance with a second aspect of the present invention is configured such that, in the first aspect, the communication terminal further includes: a voice cancelling process section which cancels, from an input voice signal generated by the handset-side microphone, a voice output from the main body-side speaker.

According to the above configuration, it is possible to suppress or prevent a voice output from the main body-side speaker from being mixed in calling carried out on the handset side. Thus, even in a case where two types of communications are carried out simultaneously, it is possible to suppress or prevent a voice from interfering with each of the communications.

A communication terminal in accordance with a third aspect of the present invention is configured such that, in the first or second aspect, the main body is provided with a Push to Talk button for starting speech in the Push to Talk method.

According to the above configuration, while calling via the IP wireless communication is carried out by the main body-side speaker and the main body-side microphone, the user can make speech by pressing the PTT button provided to the main body.

A communication terminal in accordance with a fourth aspect of the present invention is configured such that, in the third aspect, in a case where the Push to Talk button is pressed by a user while calling via the Internet Protocol telephone processing section is carried out by the handset-side speaker and the handset-side microphone, the Internet Protocol telephone processing section mutes a voice input from the handset-side microphone for a period in which the Push to Talk button is pressed.

According to the above configuration, if the PTT button is pressed during IP telephone calling, a voice input from the handset-side microphone is muted. Thus, in a case where IP wireless calling starts during IP telephone calling, merely by pressing the PTT button to make speech in the IP wireless calling, the user can prevent a conversation partner of the IP telephone calling from hearing a content of the speech.

A communication terminal in accordance with a fifth aspect of the present invention is configured such that, in the third aspect, even in a case where the Push to Talk button is pressed by a user while calling via the Internet Protocol telephone processing section is carried out by the handset-side speaker and the handset-side microphone, the Push to Talk call processing section does not output, as speech in calling via the Push to Talk call processing section, a voice input from the main body-side microphone.

According to the above configuration, even if the PTT button is pressed during IP telephone calling, the voice input is not output as speech in calling via the PTT call processing section. Thus, in a case where IP telephone calling and PTT calling are carried out simultaneously, it is possible to inhibit making speech in the PTT calling. Therefore, it is possible to prevent mixing between speech in IP telephone calling and speech in PTT calling.

A communication terminal in accordance with a sixth aspect of the present invention is configured such that, in any one of the first to fifth aspects, the Push to Talk call processing section carries out the Push to Talk calling via the Internet Protocol network.

According to the above configuration, for the PTT calling and the IP telephone calling via the IP network, the user can make a call in an appropriate call mode merely by bringing the handset into an off-hook state.

A method for controlling a communication terminal in accordance with a seventh aspect of the present invention is a method for controlling a communication terminal that includes: a Push to Talk call processing section which carries out Push to Talk calling according to a Push to Talk method; an Internet Protocol telephone processing section which carries out Internet Protocol telephone calling according to Session Initiation Protocol via an Internet Protocol network; a call control section which controls (a) Push to Talk calling via the Push to Talk call processing section and (b) calling via the Internet Protocol telephone processing section; a main body including a main body-side speaker and a main body-side microphone each of which carries out calling via the Push to Talk call processing section; a handset including a handset-side speaker and a handset-side microphone each of which carries out calling via the Internet Protocol telephone processing section, the method including the steps of: decoding an output signal from the call control section and outputting the decoded output signal to the main body-side speaker; encoding an input signal from the main body-side microphone and inputting the encoded input signal to the call control section; decoding an output signal from the call control section and outputting the decoded output signal to the handset-side speaker; and encoding an input signal from the handset-side microphone and inputting the encoded input signal to the call control section.

The above configuration provides similar effects to those of the first aspect.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: communication terminal
10: main body
11: main body-side speaker
12: main body-side microphone
14: PTT button
20: handset
21: handset-side speaker
22: handset-side microphone
51: main body-side codec
52: handset-side codec

60: voice cancelling process section

71: call control section

72: IP wireless processing section (PTT call processing section)

73: IP telephone processing section

The invention claimed is:

1. A communication terminal comprising:

a Push to Talk call processing section which carries out Push to Talk calling according to a Push to Talk method;

an Internet Protocol telephone processing section which carries out Internet Protocol telephone calling according to Session Initiation Protocol via an Internet Protocol network;

a call control section which controls (a) Push to Talk calling via the Push to Talk call processing section and (b) calling via the Internet Protocol telephone processing section;

a main body including a main body-side speaker and a main body-side microphone each of which carries out input and output of a voice in calling via the Push to Talk call processing section;

a handset including a handset-side speaker and a handset-side microphone each of which carries out input and output of a voice in calling via the Internet Protocol telephone processing section;

a main body-side codec which decodes an output signal from the call control section and outputs the decoded output signal to the main body-side speaker and which encodes an input signal from the main body-side microphone and inputs the encoded input signal to the call control section; and a handset-side codec which decodes an output signal from the call control section and outputs the decoded output signal to the handset-side speaker and which encodes an input signal from the handset-side microphone and inputs the encoded input signal to the call control section;

wherein the main body is provided with a Push to Talk button for starting speech in the Push to Talk method;

wherein, in a case where the Push to Talk button is pressed by a user while calling via the Internet Protocol telephone processing section utilizing the handset-side speaker and the handset-side microphone, the Internet Protocol telephone processing section mutes a voice input from the handset-side microphone for a period in which the Push to Talk button is pressed.

2. The communication terminal according to claim 1, further comprising:

a voice cancelling process section which cancels, from an input voice signal generated by the handset-side microphone, a voice output from the main body-side speaker.

3. The communication terminal according to claim 1, wherein:

the Push to Talk call processing section carries out the Push to Talk calling via the Internet Protocol network.

4. A communication terminal comprising:

a Push to Talk call processing section which carries out Push to Talk calling according to a Push to Talk method;

an Internet Protocol telephone processing section which carries out Internet Protocol telephone calling according to Session Initiation Protocol via an Internet Protocol network;

a call control section which controls (a) Push to Talk calling via the Push to Talk call processing section and (b) calling via the Internet Protocol telephone processing section;

a main body including a main body-side speaker and a main body-side microphone each of which carries out input and output of a voice in calling via the Push to Talk call processing section;

a handset including a handset-side speaker and a handset-side microphone each of which carries out input and output of a voice in calling via the Internet Protocol telephone processing section;

a main body-side codec which decodes an output signal from the call control section and outputs the decoded output signal to the main body-side speaker and which encodes an input signal from the main body-side microphone and inputs the encoded input signal to the call control section; and a handset-side codec which decodes an output signal from the call control section and outputs the decoded output signal to the handset-side speaker and which encodes an input signal from the handset-side microphone and inputs the encoded input signal to the call control section;

wherein the main body is provided with a Push to Talk button for starting speech in the Push to Talk method;

wherein, even in a case where the Push to Talk button is pressed by a user while calling via the Internet Protocol telephone processing section utilizing the handset-side speaker and the handset-side microphone, the Push to Talk call processing section does not output, as speech in calling via the Push to Talk call processing section, a voice input from the main body-side microphone.

5. A method for controlling a communication terminal that includes: a Push to Talk call processing section which carries out Push to Talk calling according to a Push to Talk method; an Internet Protocol telephone processing section which carries out Internet Protocol telephone calling according to Session Initiation Protocol via an Internet Protocol network; a call control section which controls (a) Push to Talk calling via the Push to Talk call processing section and (b) calling via the Internet Protocol telephone processing section; a main body including a main body-side speaker and a main body-side microphone each of which carries out calling via the Push to Talk call processing section, the main body being provided with a Push to Talk button for starting speech in the Push to Talk method; a handset including a handset-side speaker and a handset-side microphone each of which carries out calling via the Internet Protocol telephone processing section, the method comprising the steps of:

decoding an output signal from the call control section and outputting the decoded output signal to the main body-side speaker;

encoding an input signal from the main body-side microphone and inputting the encoded input signal to the call control section;

decoding an output signal from the call control section and outputting the decoded output signal to the handset-side speaker; and encoding an input signal from the handset-side microphone and inputting the encoded input signal to the call control section;

muting, by the Internet Protocol processing section, voice input from the handset-side microphone for a period in which the Push to Talk button is pressed in a case where the Push to Talk button is pressed by a user while calling via the Internet Protocol telephone processing section utilizing the handset-side speaker and the handset-side microphone.

* * * * *